E. J. TOMLINSON.
GOVERNOR FOR ELECTRIC CIRCUITS.
APPLICATION FILED JUNE 22, 1920.
1,415,496.
Patented May 9, 1922.
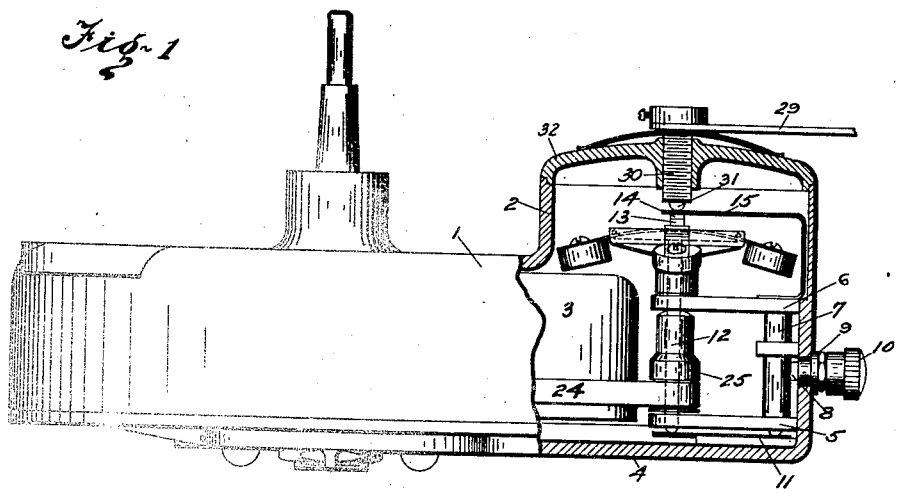
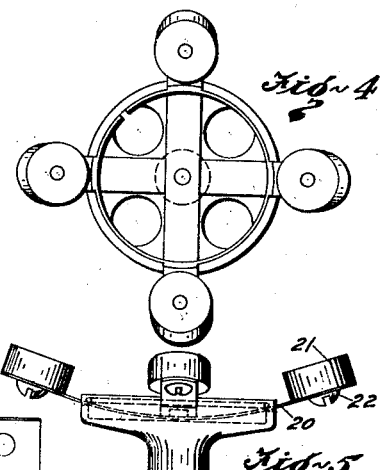
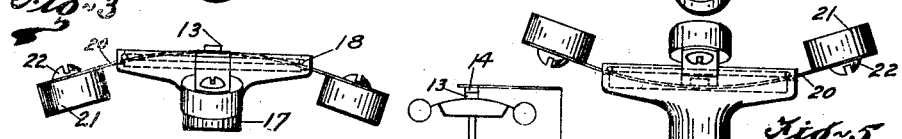
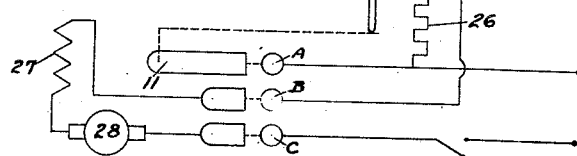
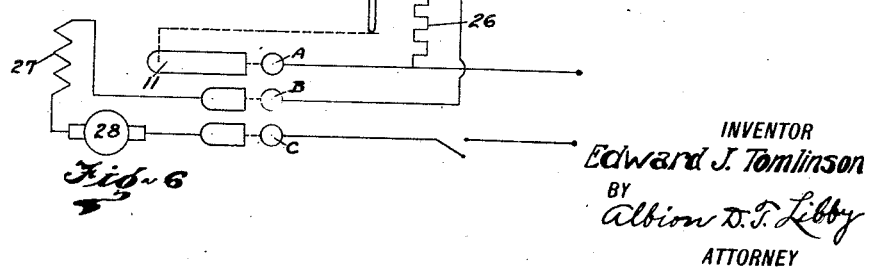
INVENTOR
Edward J. Tomlinson
BY
Albion D. T. Libby
ATTORNEY

UNITED STATES PATENT OFFICE.

EDWARD J. TOMLINSON, OF NEWARK, NEW JERSEY, ASSIGNOR TO SPLITDORF ELECTRICAL COMPANY, OF NEWARK, NEW JERSEY.

GOVERNOR FOR ELECTRIC CIRCUITS.

1,415,496.  Specification of Letters Patent.  Patented May 9, 1922.

Application filed June 22, 1920. Serial No. 390,984.

*To all whom it may concern:*

Be it known that I, EDWARD J. TOMLINSON, a citizen of the United States, residing at Newark, in the county of Essex, State of New Jersey, have invented certain new and useful Improvements in Governors for Electric Circuits, of which the following is a description, reference being had to the accompanying drawing and to the figures of reference marked thereon.

This invention relates to a governor for an electric circuit and as illustrated is shown in use as a governor for regulating the speed of a phonograph motor. In my application 382,794 filed May 20, 1920, I have shown and described an electric motor in which the various parts of the motor, such as the field structure, armature and commutator, brushes, etc., may be readily gotten at for the purpose of replacements, cleaning and repairing.

In the motor set forth in the above mentioned application, no particular form of governor was described. However, in my copending application S. N. 387,496 filed June 8, 1920, I have described a form of governor suitable for such a motor.

It is the principal object of this application to describe another type of governor suitable for operation in connection with the motor referred to, although it is to be understood that the governor may be used in various other combinations.

Another object of my invention is to provide a governor for an electrical circuit which is very simple and cheap to manufacture.

In the drawings:

Figure 1 is a view of a phonograph motor with a portion of the casing broken away to show the governor parts in a certain position.

Figure 2 is a top plan view of the main portion of the governor.

Figure 3 is a side view of Figure 2.

Figure 4 is a view similar to Figure 2 but with certain parts of the governor in reversed position.

Figure 5 is a side view of Figure 4.

While Figure 6 is a diagrammatical view of the electrical circuit through the motor and the governor.

Referring now to the details wherein like numbers refer to corresponding parts in the various views, 1 is a main casing of the motor adapted to be mounted on the mounting board of the phonograph as set forth in my applications above referred to. The casing 1 has a projection 2 within which the governor mechanism is mounted. The projection 2 has a small cover plate 32 which may be readily removed for getting at the various parts of the governor. The rotating part of the motor 3 is carried within the main casing 1 and is held in position therein by the cover plate 4. Carried within the casing extension 2 and fastened to the side walls thereof are two plates 5 and 6, preferably of some insulated material, such as fibre. The plates 5 and 6 are held in permanent spaced relationship through the medium of suitable metallic connectors 7, which in turn have studs 8 fastened thereto in any suitable manner. The studs 8 pass through the side wall of the casing, but are insulated therefrom by insulators 9, thumb nuts 10 being attached to the outer ends of studs 8 for the purpose of clamping electrical conductors underneath the shoulders of the thumb nuts 10, which are indicated diagrammatically in Figure 6 as A, B, C. The lower ends of the metallic connectors 7 are hollow as described in my application 387,496 filed June 8, 1920, and carry ball contacts which are spring pressed against yielding contact members carried on the cover plate 4. Figure 1 shows a spring 11 joining the connectors 7 to one end of a shaft 12 that is carried by the plates 5 and 6. The upper end of the shaft 12 carries a contact 13 adapted to co-operate with a contact 14 mounted on the end of a resilient member 15 which in turn is connected to the upper end of the connectors 7 which has an electrical connection passing through the plate 6. Mounted on the upper end of shaft 12 is a disc member 16 having a hub 17 which fastens both the parts 16 and 17 to the shaft 12. The disc 16 is cup shaped and has an annular groove 18 cut on its inner periphery with a plurality of slots arranged diametrically opposite each other in pairs. Carried within the slots are resilient members 20, on the ends of which are weights 21, the same being held thereto in any suitable manner such as by screws 22. As shown in the various figures of the drawing two springs 20 are used, crossing each other at substantially right angles, although it is to be understood that I may use but one spring, or a plurality thereof. When a plurality of springs is used, I prefer to fasten them together at the center and as indicated the contact 13 is utilized as a fastening means. The resilient members 20 are held in position in the slots 19 by a resilient member 23 that is adapted to snap into the groove 18, after the members 20 are put in position. It will be seen from this construction that the members 20 are freely held in the said grooves 19 and where two of them are used as indicated in the drawings, longitudinal movement of one of the members 20 is prevented by reason of its attachment to the other member 20 which is mounted preferably at right angles to it.

As shown in Figure 1, when the shaft 12 is operated by belt 24 which is driven by the rotatable member 3 and the combination of a pulley bushing 25, as the centrifugal force causes the weights 21 to move to a position such as to straighten the members 20, contact 13 moves downwardly away from contact 14, which will control the action of the resistance 26 shown in Figure 6 and hence the speed of the motor, the field winding being indicated at 27 and the armature at 28. The relative position of the contacts 13 and 14 may be varied in any suitable manner, such as by the lever 29 attached to a screw 30 carrying an insulated knob 31 that engages the spring 15.

It will be understood that in place of using the shaft 12 as one part of the governor circuit, I may use a pair of springs as shown in my application S. N. 387,496 filed June 8, 1920. I may also use the members 20 is reversed position as indicated in Figures 4 and 5, in which case the governor will function in reverse order from that shown in Figures 1, 2 and 3.

It will be apparent to one skilled in the art that various changes may be made in the details without departing from the spirit of my invention and the scope of the appended claims.

Having thus described my invention, what I claim is:—

1. In a governor for an electrical circuit the combination of, an operating shaft with means for supporting and driving the same, a member carried by said shaft having a plurality of slots diametrically opposite each other, a groove in said member opening into said slots, a resilient member carried in said slots and having weights on its extremity outside said member, a resilient member carried in said groove for holding said first mentioned resilient member in place in said slots, a contact carried by the last mentioned resilient member and a relatively stationary contact for co-operating with the first mentioned contact.

2. In a governor for an electrical circuit the combination of, an operating shaft with means for supporting and driving the same, a member carried by said shaft having a plurality of slots diametrically opposite each other, a groove in said member opening into said slots, a plurality of resilient members carried in different sets of said slots and having weights on their extremities outside said member, a resilient member carried in said groove for holding said resilient members in place in said slots, a contact carried at the junction of said resilient members and a relatively stationary contact for co-operating with the first mentioned contact.

3. In a governor for an electrical circuit the combination of, an operating shaft with means for supporting and driving the same, a member carried by said shaft having a plurality of slots diametrically opposite each other, a groove in said member opening into said slots, a plurality of resilient members carried in different sets of said slots and having weights on their extremities outside said member, a resilient member carried in said groove for holding said resilient members in place in said slots, a contact carried at the junction of said resilient members and serving to anchor them together and an adjustable contact to co-operate with the first mentioned contact.

4. In a governor for an electrical circuit the combination of, an operating shaft with means for supporting and driving the same, an annular cup shaped member having a hub for fastening the member to one end of said shaft, a plurality of slots in the side wall of said member, an annular groove in the interior wall of said member running into said slots, flat springs positioned in said slots and having weights attached to their extremities, a snap ring fitting said groove over said springs, a contact carried by said springs and a stationary contact to co-operate with the first contact.

5. In a governor for an electrical circuit the combination of, an operating shaft with means for supporting and driving the same, an annular cup shaped member having a hub for fastening the member to one end of said shaft, a plurality of flat springs movably supported by the side wall of said cup shaped member and extending across and beyond said member and having weights at their extremities, a contact carried at the intersection of said springs and a co-operating stationary contact.

6. In a governor for an electrical circuit the combination of, an operating shaft with means for supporting and driving the same, an annular cup shaped member having a hub for fastening the member to one end of said shaft, a plurality of flat springs fulcrumed on the side wall of said cup shaped member and extending diametrically across the same and having weights fastened thereto beyond the periphery of said member, means for fastening the springs together at their intersection, a contact carried by the springs at said intersection and an adjustable contact to co-operate with said first contact.

7. In a governor for an electrical circuit the combination of, an operating shaft with means for supporting and driving the same, an annular cup shaped member having a hub for fastening the member to one end of said shaft, a plurality of flat springs fulcrumed on the side wall of said cup shaped member and extending diametrically across the same and having weights fastened thereto beyond the periphery of said member, means for fastening the springs together at their intersection, whereby said intersecting portions of said springs have a motion parallel with said shaft as said weights respond to centrifugal force and a pair of contacts adapted to be opened and closed according to the movement of said intersecting spring portions.

8. In a governor for an electrical circuit the combination of, an operating shaft with means for supporting and driving the same, a support member carried by said shaft, a plurality of flat springs fulcrumed on said support member and extending across the axis of said shaft and beyond the support member, said springs having weights fastened thereto on either side of said shaft, means for fastening the springs together at their intersection, whereby said intersecting portions of said springs have a motion parallel with said shaft as said weights respond to centrifugal force and a pair of contacts adapted to be opened and closed according to the movement of said intersecting spring portions.

In testimony whereof, I affix my signature.

EDWARD J. TOMLINSON.